(12) United States Patent
Strauss

(10) Patent No.: US 7,695,767 B2
(45) Date of Patent: Apr. 13, 2010

(54) SELF-CLEANING SUPERHYDROPHOBIC SURFACE

(75) Inventor: Dennis R Strauss, Ventura, CA (US)

(73) Assignee: The Boeing Company, Chicago, IL (US)

( * ) Notice: Subject to any disclaimer, the term of this patent is extended or adjusted under 35 U.S.C. 154(b) by 1350 days.

(21) Appl. No.: 11/030,501

(22) Filed: Jan. 6, 2005

(65) Prior Publication Data

US 2006/0147634 A1 Jul. 6, 2006

(51) Int. Cl.
*B05D 3/00* (2006.01)
*B05D 3/04* (2006.01)

(52) U.S. Cl. .................. 427/299; 427/307; 427/327

(58) Field of Classification Search .................. 427/299, 427/307, 327
See application file for complete search history.

(56) References Cited

U.S. PATENT DOCUMENTS

| | | | | |
|---|---|---|---|---|
| 3,257,244 | A * | 6/1966 | Barkman | 428/472.2 |
| 3,428,415 | A * | 2/1969 | Chiola et al. | 423/594.1 |
| 7,011,737 | B2 * | 3/2006 | Varghese et al. | 205/189 |
| 7,285,331 | B1 * | 10/2007 | Reihs et al. | 428/411.1 |
| 2005/0115840 | A1 * | 6/2005 | Dolan | 205/324 |
| 2007/0014970 | A1 * | 1/2007 | Nun et al. | 428/141 |

OTHER PUBLICATIONS

Gong et al "Titanium oxide nanotube arrays prepared by anodic oxidation", J. Mater. Res., vol. 16, No. 12, pp. 1331-1334, 2001.*

* cited by examiner

*Primary Examiner*—Elena T Lightfoot
(74) *Attorney, Agent, or Firm*—Harness, Dickey & Pierce, P.L.C.

(57) ABSTRACT

A method for providing a superhydrophobic surface on a structure, for example aircraft wings, propellers and/or rotors, is set forth. The method includes applying a coating of hydrofluoric acid over a titanium substrate. A voltage is then applied across the titanium substrate so that current flows through the titanium substrate. The current flowing through the titanium substrate causes the hydrofluoric acid to react with the titanium substrate to anodize the titanium substrate. The anodization causes a nanoporous titanium oxide layer to grow across the titanium substrate. The titanium oxide layer includes a plurality of nano-tube structures that, once the remaining hydrofluoric acid is washed away, provide a microscopically rough surface on the titanium substrate. A conformal coating of a hydrophobic compound is then desposited on the microscopically rough surface to create a superhydrophobic surface. Thus, a substantially self-cleaning superhydrophobic surface is created on the titanium substrate, whereby, when exposed to ultraviolet light, the titanium oxide layer has a photocatalytic reaction with oxygen to oxidize any organic contaminants that may gather on the superhydrophobic surface.

15 Claims, 3 Drawing Sheets

SELF-CLEANING SUPERHYDROPHOBIC SURFACE

FIELD OF INVENTION

The invention relates generally to surfaces that are susceptible to ice, water and other contaminant buildup. More particularly, the invention relates to superhydrophobic surfaces that resist ice, water and other contaminant buildup.

BACKGROUND OF THE INVENTION

The surfaces of many structures, such as many aircraft surfaces, are susceptible to the buildup of ice, water and other contaminants that can interfere with the uses of such surfaces. For example, the buildup of ice, water and/or other contaminants on aircraft wings, propellers, rotors and other functional surfaces can dangerously interfere with the designed performance of such surfaces and cause catastrophic risks to the operation of the aircraft. When such buildups occur, much time and cost can be expended in removing the buildup.

Superhydrophobic surfaces on such structures can prevent or mitigate the buildup of ice, water and other contaminants. A superhydrophobic surface is formed by creating a microscopically rough surface containing sharp edges and air pockets in a material of poor wettability. That is, a material that is not easily wettable and sheds water well. On a superhydrophobic surface, a drop of water will form a nearly spherical bead that will roll when the surface is tilted slightly. Thus, superhydrophobic surfaces shed water and snow easily. Furthermore, superhydrophobic surfaces resist soiling by waterborne and other contaminants, and are easily cleaned and useful in directing flow in microfluidic devices. However, superhydrophobic surfaces are susceptible to contamination by organic substances such as oil and/or grease, which render the surface merely hydrophobic such that water will bead up, but stick in place on the surface.

Therefore, it is highly desirable to provide structures, for example, aircraft wings, propellers, rotors and other functional structures, with superhydrophobic surfaces that are highly resistant to the build up of organic contaminants such as oil and grease.

BRIEF SUMMARY OF THE INVENTION

In a preferred embodiment of the present invention, a method of providing a superhydrophobic surface on a structure, for example aircraft wings, propellers and/or rotors, is set forth. The method includes applying a coating of hydrofluoric acid over a titanium substrate. A voltage is then applied across the titanium substrate so that current flows through the titanium substrate. The current flowing through the titanium substrate causes the hydrofluoric acid to react with the titanium substrate to anodize the titanium substrate. The anodization causes a nanoporous titanium oxide layer to grow across the titanium substrate. The titanium oxide layer includes a plurality of nano-tube structures that, once the remaining hydrofluoric acid is washed away, provide a microscopically rough surface on the titanium substrate. A conformal coating of a hydrophobic compound is then desposited on the microscopically rough surface to create a superhydrophobic surface. The hydrophobic compound can be deposited using any suitable form, for example, from solution or plasma or condensed from a gas. Thus, a substantially self-cleaning superhydrophobic surface is created on the titanium substrate, whereby, when exposed to ultraviolet light, the titanium oxide layer has a photocatalytic reaction with oxygen to oxidize any organic contaminants that may gather on the superhydrophobic surface.

In a preferred implementation, the surface of the titanium substrate is polished prior to applying the coating of hydrofluoric acid. The voltage applied across the titanium substrate is preferably a DC voltage, for example, a DC voltage between 1 and 20 VDC. The conformal coating can be any suitable hydrophobic compound or polymer that will conformally coat the microscopically rough titanium oxide layer to form the superhydrophobic surface. For example, the coating could include Teflon® precursors, a suitable fluorocarbon or fluorinated alkylsilane. To provide the superhydrophobic surface, the coating is preferably deposited onto the layer of titanium oxide in a layer approximately 1 to 10 nanometers thick.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of various embodiments is merely exemplary in nature and is in no way intended to limit the invention, its application or uses. Additionally, the advantages provided by the embodiments, as described below, are exemplary in nature and not all embodiments provide the same advantages or the same degree of advantages.

Figure 1:
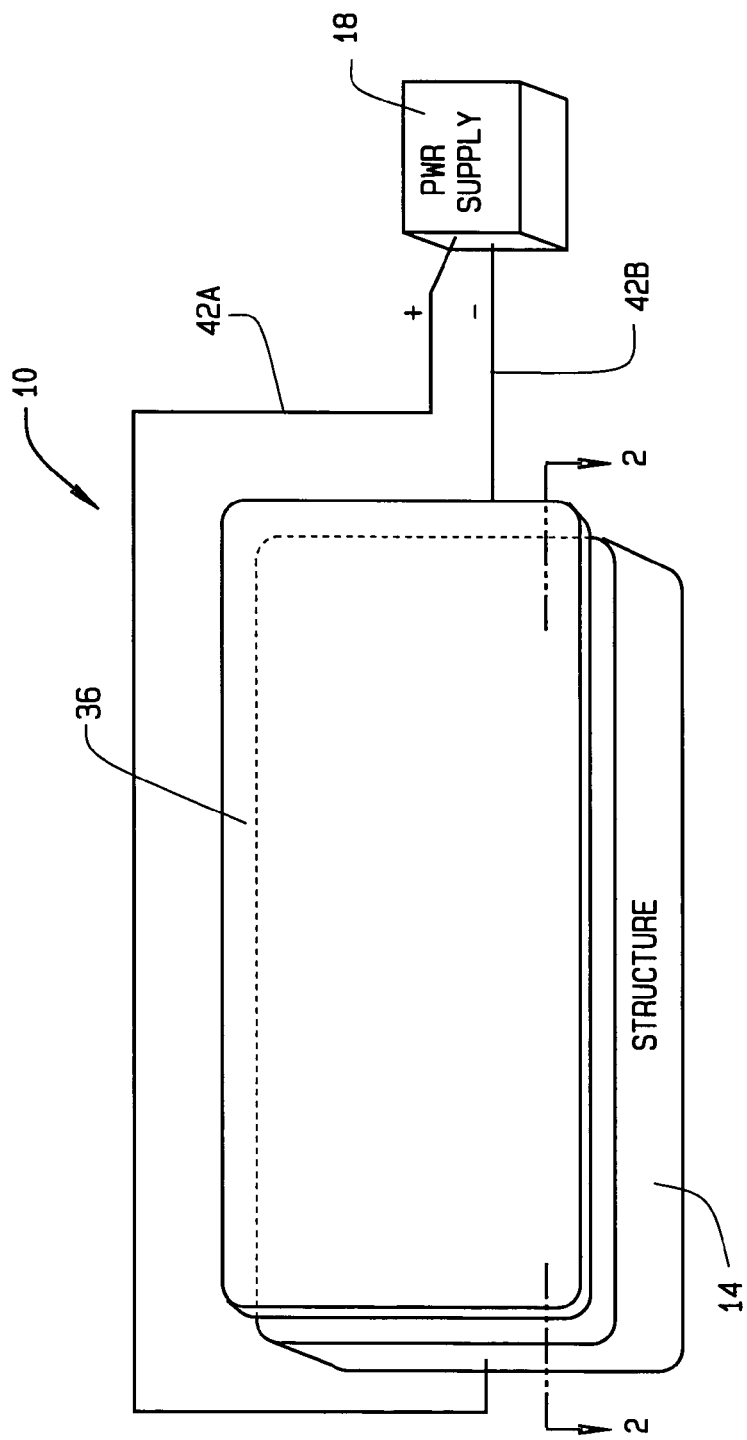
FIG. 1 is a block diagram of a system for generating a superhydrophobic surface on structure.

FIG. 1 is a block diagram of a system 10 for generating a superhydrophobic surface on structure 14. The structure 14 can be any surface susceptible to the build up of ice, water and/or other contaminants. For example, the structure 14 can be aircraft wings, propellers, rotors and other functional surfaces of an aircraft where the build up of ice, water and/or other contaminants can dangerously interfere with the designed performance of such surfaces and cause catastrophic risks to the operation of the aircraft. Generally, the system 10 includes the structure 14 and a power supply 18 that is used to provide a voltage across the structure 14, as described in detail below. The power supply 18 is preferably a direct current (DC) voltage source. In one implementation, the power supply 18 is a DC voltage source.

Figure 2A:
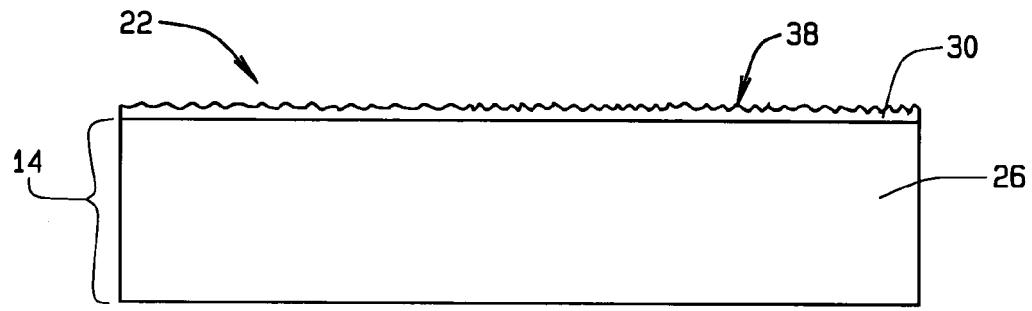
FIG. 2A is a cross-sectional view of a superhydrophobic structure created utilizing the system shown in FIG. 1 along line 2-2 of the structure shown in FIG. 1, in accordance with a preferred embodiment of the present invention.
Figure 2B:
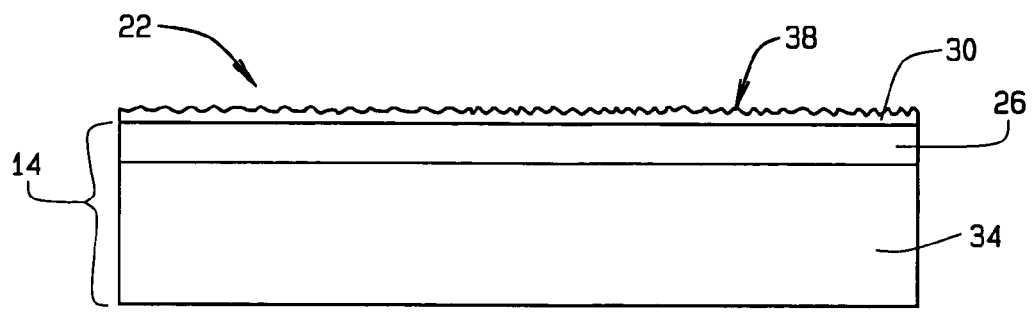
FIG. 2B is a cross-sectional view of a superhydrophobic structure created utilizing the system shown in FIG. 1 along line 2-2 of the structure shown in FIG. 1, in accordance with another preferred embodiment of the present invention.

FIG. 2A is a cross-sectional view of a superhydrophobic structure 22 created utilizing the system 10 along line 2-2 of the structure 14 shown in FIG. 1, in accordance with an embodiment of the present invention. The superhydrophobic structure 22 includes the structure 14 constructed of titanium, which is referred to herein as a titanium substrate 26. Additionally, the superhydrophobic structure 22 includes a nanoporous titanium oxide layer 30 grown across at least a portion of the surface of the titanium substrate 26. Alternatively, as shown in FIG. 2B, the structure 14 is constructed of a base substrate 34 bonded to the titanium substrate 26 that has the nanoporous titanium oxide layer 30 grown across at least of portion thereof. The base substrate 34 can be any metal or composite suitable for bonding with the titanium substrate 26.

The nanoporous titanium oxide layer 30 is grown on the titanium substrate 26 by anodization. To anodize the titanium substrate 26, a coating of hydrofluoric acid is applied to the titanium substrate 26. The hydrofluoric acid is an electrolyte for the anodization process and can be applied using any suitable means for applying a sufficiently even coat across all portions of the titanium substrate 26 desired to be anodized. For example the hydrofluoric acid can be sprayed or brushed onto the titanium substrate 26 or the structure 14 can be dipped into a solution of hydrofluoric acid. In one embodiment, the titanium substrate 26 is polished prior to application of the hydrofluoric acid to make the surface of the titanium substrate smooth. The titanium substrate 26 can be polished using any suitable polishing means, such as electro-polishing.

The power supply 18, shown in FIG. 1, is utilized to apply a voltage across the titanium substrate 26 such that current flows through the titanium substrate 26. The power supply 18 includes a pair of electrodes 42. A positive electrode 42A is connected to the structure 14 that acts an anode. A negative electrode 42B is connected to a conductive plate 36 (shown in FIG. 1) that acts as a cathode. In one implementation the cathode, i.e. conductive plate 36, is approximately the same size as the titanium substrate 26. The cathode is connected to titanium substrate 26 after the hydrofluoric acid has been applied such that the hydrofluoric acid is sandwiched between the cathode and the titanium substrate 26. When voltage is applied across the titanium substrate 26, current flowing through the titanium substrate 26 and the hydrofluoric acid cause an electrochemical reaction between the hydrofluoric acid and the titanium substrate 26 that anodizes the surface of the titanium substrate 26. This anodization induces the titanium oxide layer 30 to grow on the titanium substrate 26. The resulting titanium oxide layer 30 has a microscopically rough surface texture that comprises a plurality, e.g. thousands, of nano-tube structures 38.

The nano-tube structures 38 are microscopic structures that protrude from the surface of the titanium substrate 26, i.e. from the titanium oxide layer 30. For example, the nano-tube structures 38 can be 16 nanometers in diameter and thickness. The nano-tube structures 38 create a microscopically rough surface containing sharp points and valleys in the titanium oxide layer 30. Any remaining hydrofluoric acid is washed off the nano-tube structures 38 so that a conformal hydrophobic film or coating can be deposited onto the titanium oxide layer 30. The hydrophobic coating can be deposited from a plasma, a solution or a gas. The hydrophobic coating is deposited onto the titanium oxide layer 26 to render the surface of the titanium substrate 26 superhydrophobic. The resulting superhydrophobic surface is effectively self-cleaning because the titanium oxide layer 30 has a photocatalytic reaction with oxygen in surrounding air when exposed to ultraviolet light, e.g. sunlight. The photocatalytic reaction photooxidizes any organic contaminants that may gather on the superhydrophobic surface. The hydrophobic coating can be deposited over the titanium oxide layer 30 using any suitable means. For example, the hydrophobic coating can be sprayed on, evaporated on, or the structure 14 with the titanium oxide layer 30 can be dipped into a suitable solution.

Figure 3:
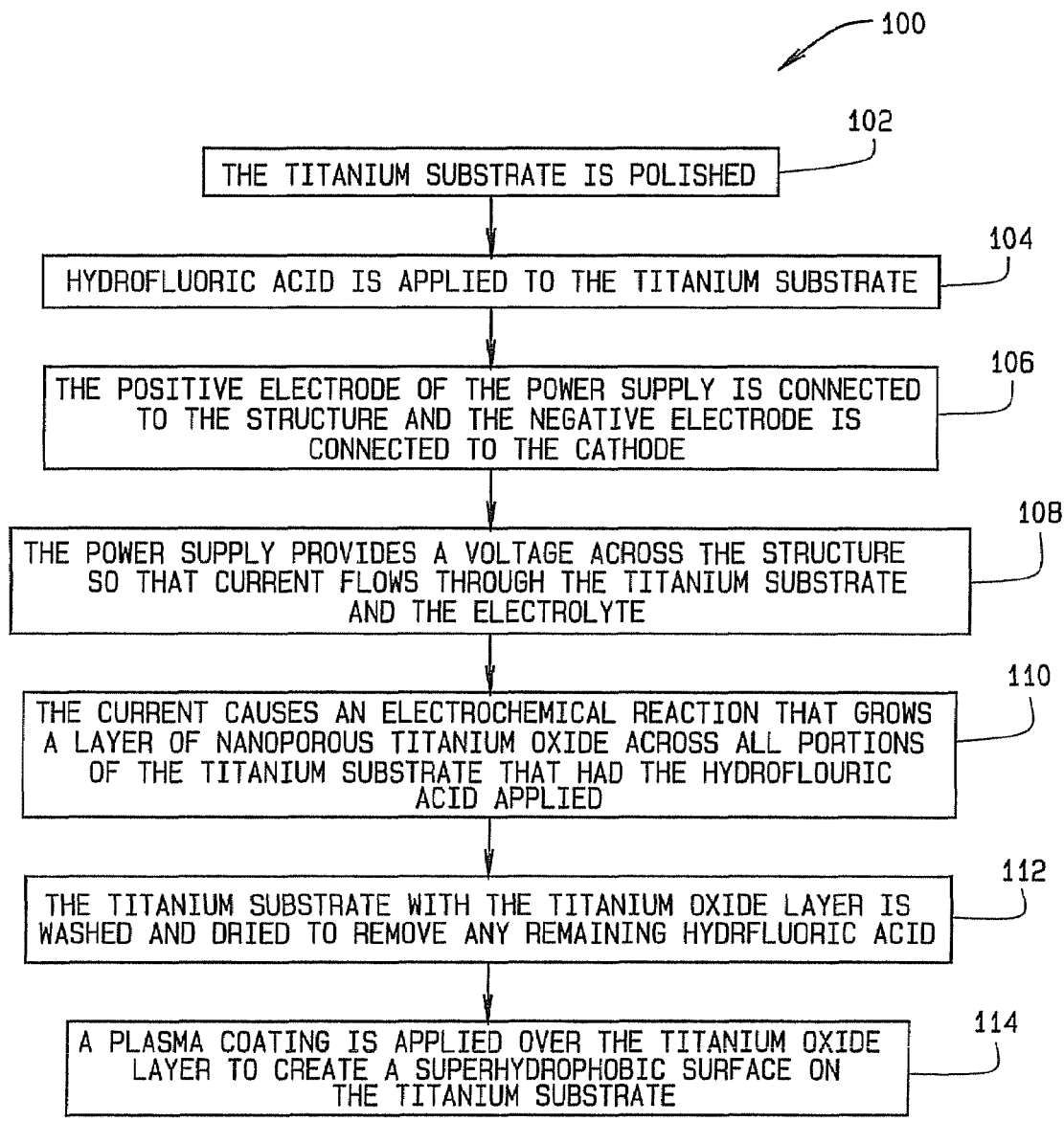
FIG. 3 is a flow chart of a method for providing a superhydrophobic surface on the structure shown in FIG. 1, in accordance with a preferred embodiment of the present invention.

FIG. 3 is a flow chart 100 of a method for providing the superhydrophobic surface on the structure 14, in accordance with one embodiment of the present invention. Initially, the titanium substrate is polished using any suitable polishing process, e.g. electro polishing, as indicated at 102. Hydrofluoric acid is then applied to all portions of the titanium substrate 26 desired to have a superhydrophobic surface, as indicated at 104. The hydrofluoric acid is applied using any suitable application process, e.g. spraying or brushing the hydrofluoric acid onto the titanium substrate 26 or dipping structure 14 into a hydrofluoric acid solution. In one embodiment the hydrofluoric acid is a 0.5% aqueous hydrofluoric acid solution. Alternatively, the hydrofluoric acid can be applied to the titanium substrate 26 without first polishing the titanium substrate 26. Next, the positive electrode 42A of the power supply 18 is connected to the structure 14 and the negative electrode 42B is connected to cathode, i.e. conductive plate 36, as indicated at 106. The power supply 18 provides a voltage across to the structure 14 and cathode so that current flows through the titanium substrate 26 and the electrolyte, i.e. the hydrofluoric acid, as indicated at 108. In one implementation the voltage is a DC voltage between +1 and +20 VDC, for example +17 VDC. The current flowing through the titanium substrate 26 causes the hydrofluoric acid and the titanium substrate to undergo an electrochemical reaction that grows the layer 30 of nanoporous titanium oxide across all portions of the titanium substrate 26 that had the hydrofluoric acid applied, as indicated at 110. The titanium oxide layer 30 comprising a plurality, e.g. thousands to hundreds of thousands, of microscopic nano-tube structures 38.

The titanium substrate 26 having the titanium oxide layer 30 is washed and dried to remove any remaining hydrofluoric acid from the titanium oxide layer 30, as indicated at 112. Once the remaining hydrofluoric acid is washed away the nano-tube structures 38 in the titanium oxide layer 30 create a microscopically rough surface texture surface on the titanium substrate 26. A hydrophobic coating is then applied over the titanium oxide layer 30 to create a superhydrophobic surface on the titanium substrate 26, as indicated at 114. In one implementation the hydrophobic coating is applied to be a substantially even layer ap proximately 1 to 10 nanometers thick across the titanium oxide layer 30. The hydrophobic coating can be any suitable hydrophobic coating that, when applied to the washed titanium oxide layer 30 will provide a superhydrophobic surface on the titanium substrate 26, i.e. on the structure 14. For example, the hydrophobic coating can be suitable polytetrafluoroethylene (Teflon®) precursors, suitable fluorocarbons or fluorinated alkylsilane. In a preferred implementation the hydrophobic coating comprises $CF_3(CF_2)_5(CH_2)_2Si(OC_2H_5)_3$ (tridecafluoro-1,1,2,2-tetrahydrooctyl) trethoxysilane vapor applied to the titanium oxide layer 30 and baked at an appropriate temperature for an appropriate time, e.g. 110° C. (230° F.) for approximately 10 minutes.

The resulting superhydrophobic surface is furthermore self-cleaning due to a photocatalytic reaction of the titanium oxide layer 30 with oxygen in surrounding air. More specifically, when the superhydrophobic surface is exposed to an ultraviolet light source, such as the sun, the photocatalytic reaction of the titanium oxide with oxygen oxidizes any organic contaminants on the superhydrophobic surface, e.g. dirt, oil and grease.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for treating a surface, comprising:
    anodizing at least a portion of a titanium substrate to produce a nanoporous titanium oxide layer across said portion of the titanium substrate;
    applying a hydrophobic coating over the titanium oxide layer, and
    wherein the titanium oxide layer is grown to comprise nano-tube structures each having a diameter of about 16 nanometers; and
    wherein anodizing said portion of the titanium substrate comprises applying a coating of hydrofluoric acid electrolyte over said portion of the titanium substrate; and
    wherein anodizing said portion of the titanium substrate further comprises providing a voltage across said portion of the titanium substrate such that current flows through said portion of the titanium substrate and the hydrofluoric acid electrolyte to grow the titanium oxide layer comprising a plurality of nano-tube structures.

2. The method of claim 1, wherein anodizing said portion of the titanium substrate comprises polishing the surface of the titanium substrate prior to applying the coating of the hydrofluoric acid.

3. The method of claim 1, wherein providing a voltage across said portion of the titanium substrate comprises applying a DC voltage between 1 and 20 volts across said portion of the titanium substrate.

4. The method of claim 1, wherein applying the hydrophobic coating comprises washing the titanium substrate to remove the coating of hydrofluoric acid such that the nano-tube structures create a microscopically rough surface on the titanium substrate.

5. The method of claim 4, wherein applying the hydrophobic coating further comprises depositing an approximately 1 to 10 nanometers thick hydrophobic coating onto said portion of the titanium oxide layer to create a superhydrophobic surface on said portion of the titanium substrate, whereby the titanium oxide layer provides a photocatalytic reaction with oxygen in surrounding air to oxidize organic contaminants on the superhydrophobic surface.

6. The method of claim 4, wherein the hydrophobic coating comprises polytetrafluoroethylene.

7. The method of claim 4, wherein the hydrophobic coating comprises a fluorocarbon coating.

8. The method of claim 4, wherein the hydrophobic coating comprises fluorinated alkylsilane.

9. A method of providing a superhydrophobic surface on a structure, said method comprising:
    applying a coating of hydrofluoric acid over a titanium substrate;
    providing a voltage across the titanium substrate such that current flows through the titanium substrate and the hydrofluoric acid to grow a nanoporous titanium oxide layer across the titanium substrate, the titanium oxide layer comprising a plurality of nano-tube structures each having a diameter of about 16 nanometers; and
    applying a hydrophobic coating having a thickness range of about 1-10 nanometers over the titanium oxide layer to create a superhydrophobic surface on the titanium substrate, whereby, when exposed to ultraviolet light, the titanium oxide layer provides a photocatalytic reaction with oxygen in surrounding air to oxidize organic contaminants on the superhydrophobic surface.

10. The method of claim 9, wherein the method further comprises polishing the surface of the titanium substrate prior to applying the coating of hydrofluoric acid.

11. The method of claim 9, wherein providing a voltage across the titanium substrate comprises applying a DC voltage between 1 and 20 volts across the titanium substrate.

12. The method of claim 9, wherein applying the hydrophobic coating comprises washing the titanium substrate to remove the coating of hydrofluoric acid such that the nano-tube structures create a microscopically surface on the titanium substrate.

13. The method of claim 12, wherein the hydrophobic coating comprises polytetrafluoroethylene.

14. The method of claim 12, wherein the hydrophobic coating comprises a fluorocarbon coating.

15. The method of claim 12, wherein the hydrophobic coating comprises fluorinated alkylsilane.

* * * * *